United States Patent [19]
Steiner et al.

[11] 3,857,257
[45] Dec. 31, 1974

[54] COUPLING WITH MECHANICAL OVERLOAD SAFETY DEVICE

[75] Inventors: Gerd Steiner, Darmstadt-Arheilgen; Rainer Kuhnpast, Dusseldorf, both of Germany

[73] Assignee: Schloemann Aktiengesellschaft, Dusseldorf, Germany

[22] Filed: July 27, 1973

[21] Appl. No.: 383,249

[30] Foreign Application Priority Data
July 27, 1972 Germany............................ 2236856

[52] U.S. Cl................................. 64/28 R, 64/27 B
[51] Int. Cl................................................ F16d 9/00
[58] Field of Search................. 64/15 B, 27 B, 28 R

[56] References Cited
UNITED STATES PATENTS

| | | |
|---|---|---|
| 490,313 | 1/1893 | Schlickeysen...................... 64/28 R |
| 1,011,425 | 12/1911 | Glover et al........................ 64/28 R |
| 1,795,258 | 3/1931 | Martin ................................ 64/28 R |
| 1,972,601 | 9/1934 | Regan............................. 64/28 R X |
| 2,838,920 | 6/1958 | Hill, Jr. et al..................... 64/28 R |
| 2,964,931 | 12/1960 | Sorenson............................ 64/28 R |

*Primary Examiner*—Allan D. Herrmann
*Attorney, Agent, or Firm*—Holman & Stern

[57] ABSTRACT

A coupling has two halves which are coupled together by a frangible coupling member which acts as a mechanical overload safety device. The coupling member is pre-stressed in order to urge abutments on the respective coupling halves together, and the coupling member has a zone of reduced strength which fractures when the pre-stress on the coupling member has been overcome and an additional force is applied to the coupling member.

10 Claims, 6 Drawing Figures

COUPLING WITH MECHANICAL OVERLOAD SAFETY DEVICE

BACKGROUND OF THE INVENTION

The invention relates to a coupling with a mechanical overload safety device, for transmitting torque between two rotary members, which are usually shafts. The coupling comprises two coupling parts which may be referred to as coupling halves, namely a driving coupling part and a driven coupling part, and also a coupling member which couples the two coupling parts together at a position spaced from the axis of the coupling, the coupling member having a zone of reduced strength which is subjected to an additional force when a predetermined load on the coupling is exceeded and which fractures when a predetermined overload is exceeded, to interrupt effective transmission between the two coupling parts. The predetermined load on the coupling can be referred to as the nominal load of the coupling, though the nominal load may be below this value. It is the purpose of such couplings to interrupt the power flow from a drive to a machine when a critical load value (the predetermined overload) is exceeded in order to avoid damage to the machine in the event of severe overloading.

In a known coupling of this kind (German Offenlegungs-schrift No. 2 041 723), the coupling member is clamped to each coupling part by respective radially-extending wings, one wing being rigidly clamped with a resilient intermediate member. The latter wing however has sufficient clearance on both sides for the free end of the wing to make contact only if the resilient intermediate member is correspondingly compressed after the nominal load has been exceeded. The coupling member is stressed only in shear up to the nominal load, will then be additionally stressed in torsion and is thus able to fracture immediately.

Although this overload safety device has greater durability than that of couplings in which shear pins are rigidly clamped at both ends (which can break due to material fatigue after prolonged use even without the nominal load having been exceeded), the constant pulsating or alternating stresses also impose an additional loading on the coupling member to reduce the fatigue strength thereof in a manner which cannot be predicted. In order to reliably preclude fracture of the coupling member before the nominal load has been exceeded, it is necessary to have correspondingly larger dimensions for the coupling member's zone of reduced strength.

THE INVENTION

In accordance with the invention, the two coupling parts are stressed at said predetermined or nominal load against fixed abutments by means of a flexible or resilient coupling member.

The coupling of the invention can be constructed in such a way that no alternating or pulsating stresses are able to act on the coupling member. Because of the pre-stress on the two coupling parts, the stress on the coupling element when torque is transmitted by the coupling, remains very small because the transmission forces are obtained mainly by relieving the abutments. The coupling is very stiff until the nominal load is reached. The abutments separate only after the nominal load limit has been exceeded. The load is redistributed on the coupling member so that the stress applied to the zone of reduced strength rises steeply and fractures quickly or immediately.

Objects and further advantages and features of the invention will be apparent from the following description of preferred embodiments of the invention.

BRIEF DESCRIPTION OF THE DRAWINGS

The invention will be further described, by way of example, with reference to the accompanying drawings, in which:-

DESCRIPTION OF A FIRST PREFERRED EMBODIMENT

Figure 1:
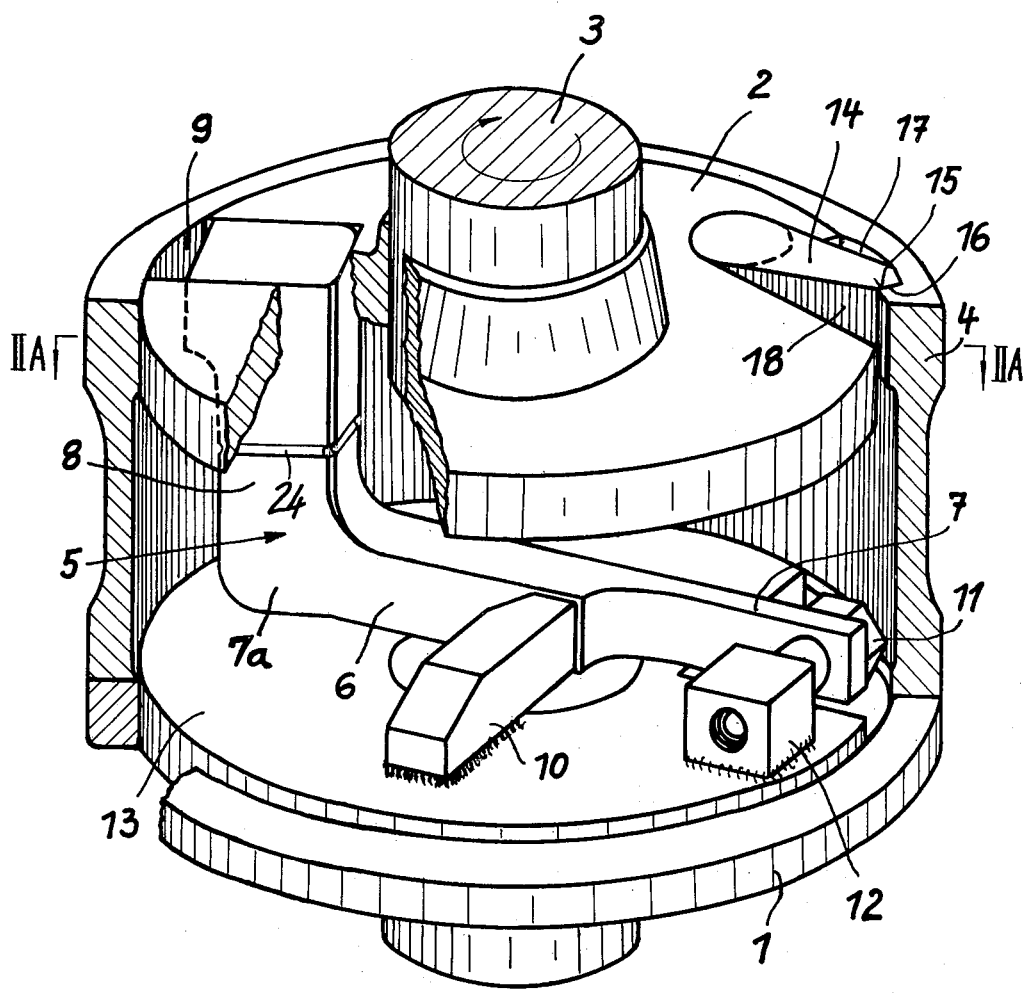
FIG. 1 is a perspective view of a first embodiment of the invention, shown partly cut away.

The coupling illustrated in FIG. 1 comprises a main driving coupling part or half 1 and a main driven coupling member or half 2 fixed to a shaft 3. The coupling half 2 is disc-like and is centered by the edge 4 of the coupling half 1, which is cup-like and is coupled therewith by means of a pre-stressed, frangible coupling member 5, in the manner described below.

The coupling member 5 comprises a radial beam 6 which has a rigid part 7a and a flexible part 7 of reduced cross-section, and a part 8 which extends parallel to the axis of coupling. The part 8 is of generally square cross-section and its end portion engages in a corresponding recess 9 in the driven coupling half 2 and is thereby non-rotationally coupled thereto.

The reduced cross-section part 7 of the coupling member 5 is retained by a screw 11 which is screwed into a screw-threaded lug 12 on the base 13 of the driving coupling half 1. The beam 6 bears against an abutment 10 which is disposed on the base 13 of the coupling half 1 and is at a position adjacent the beginning of the reduced part 7, preferably on the far side of the axis of the coupling to the part 8. An outwardly pivotable pawl 14 with an abutment surface 15 is disposed in the driven coupling half 2 and its abutment surface 15 bears against an abutment surface 16 in a recess 17 in the edge 4 of the coupling half 1 when the coupling is stressed. The pawl 14 and the abutment surface 16 provide abutment means on the coupling halves 1, 2 which engage and prevent relative rotation between the coupling halves 1, 2 in a direction opposite to that of relative rotation which torque transmitted by the coupling tends to cause. The pawl 14 is in a recess 18 of appropriate size in the coupling half 2, which recess enables the pawl 14 to pivot back sufficiently to allow the coupling half 2 to rotate freely relative to the coupling half 1 in the torque transmission direction of rotation. In this way, it is possible for the coupling half 2 to be stressed against the coupling half 1 to the valve corresponding to the nominal load of the coupling or slightly above the nominal load by tightening the screw 11.

Figure 2A:
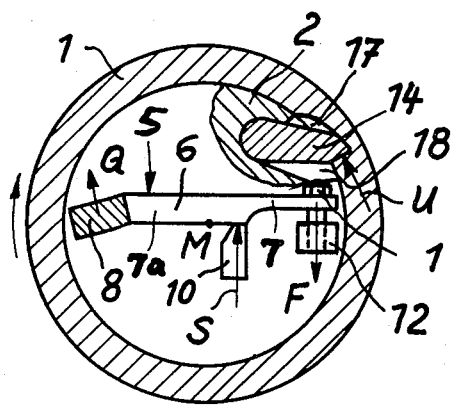
FIG. 2a is a transverse section through the coupling of FIG. 1, along the plane A—A, showing the coupling under normal load, most of the driven coupling half being cut away.
Figure 2B:
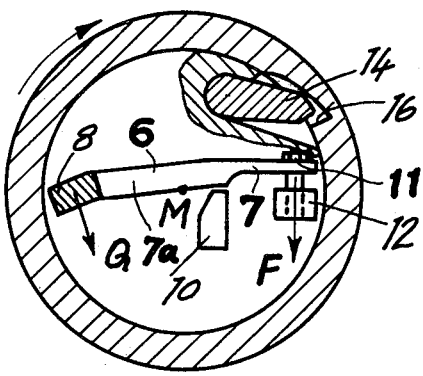
FIG. 2b is the same section as in FIG. 2a, but showing the coupling under an overload.

The effect of pre-stressing is illustrated in FIGS. 2a and 2b. Most of the driven coupling half 2 is cut away, only that part adjacent the pawl 14 being shown. FIG. 2a shows the coupling with the pre-stressed coupling member 5 under normal load, during which the following forces occur:

F = setting force of the screw 11;
S = bearing force acting on the abutment 10;
Q = force acting at the recess 9 in the coupling half 2; and
U = tangential force between the pawl 14 and the abutment surface 16.

The direction of rotation of the coupling is indicated by an arrow in FIGS. 1, 2a, and 2b. Under normal loads, only the tangential force U is reduced and its reduction is equal to the torque transmitted to the shaft 3; the forces Q, S and F remain the same and the coupling member 5 is not further loaded. Only when the nominal load is exceeded, that is to say when the tangential force U drops to zero, and the torque transmitted to the shaft 3 exceeds the pre-stress moment, the pawl 14 will lift off the abutment surface 16 (FIG. 2b), and the following effects also occur: the part 7, which is more resilient because of the reduced cross-section of the material, yields more extensively than the rigid part when the pawl 14 is lifted from the abutment surface 16 so that the beam 6 lifts off the abutment 10 because the beam 6 practically maintains its radial position relative to the coupling half 2 and therefore bends about the axis M of the coupling. At the moment of lift-off, the force S drops to zero and the bending moment increases at Q suddenly in accordance with the distance between the part 8 and the screw-threaded lug 12 and in accordance with the force F. The cross-section of the part 8 is simultaneously torsionally stressed due to the relative motion between the two coupling halves 1 and 2 so that this part instantly breaks due to the substantial additional stress. In other words, the non-rotary engagement of the end portion of the part 8 in the recess 9, the relationship of the abutment 10 to the beam 6 and the retention of the reduced cross-section part 7 by the screw 11 act as means for subjecting the part 8, which provide a zone of reduced strength, to an additional force when the load or torque reaction on the coupling half 2 exceeds the predetermined, nominal load or torque (equivalent to the product of the tangential force U and the radius of its point of application).

Appropriate dimensioning of the torsional cross-section is of course an essential prerequisite for fracture and the cross-section of the part 8 can be still further weakened by appropriate shaping (rectangular or triangular) and by a notch 24 (see FIG. 1) at any suitable position, which notch 24 defines a restricted zone of reduced strength. Depending on the construction of the coupling member 5, the load, i.e., the sum of the nominal load and the predetermined overload, may be designed to increase to 5 to 20 times the nominal load before fracture; however, the arrangement is preferably such that fracture occurs when the load reaches 1.5 to 2 times the nominal load.

DESCRIPTION OF A SECOND PREFERRED EMBODIMENT

Figure 3:
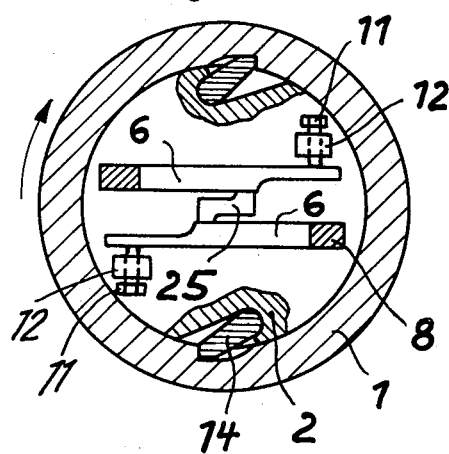
FIG. 3 is a section corresponding to that of FIG. 2a, but showing a second embodiment of the invention.

If only one coupling member 5 is used as in the first embodiment, the coupling bearings (not shown, but which can be conventional) must also absorb the transverse force Q. However, this can be prevented by providing two coupling members 5 of the same construction. FIG. 3 shows a second embodiment, having such a coupling construction in which two adjustable screws 11 and lugs 12 are disposed symmetrically with respect to each other. The beams 6 of the coupling members 5 in this case are positioned parallel to each other and the distance between them is such as is required for a double-acting abutment 25 which is mounted on the base 13 of the coupling half 1. There are also two symmetrically positioned pawls 14 and abutment surfaces 16, acting as a free-wheeling device.

DESCRIPTION OF A THIRD PREFERRED EMBODIMENT

Figure 4:
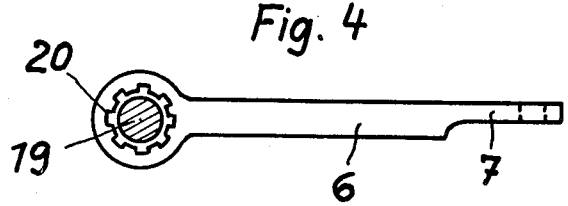
FIG. 4 shows a part of a third embodiment of the invention.

To facilitate the exchange of the coupling member 5, it is possible to construct the part or limb 8 of the coupling member 5 as a bolt 19, as in the third embodiment, of FIG. 4; both ends of the bolt 19 are non-rotationally coupled to respective abutment surfaces 20, for example formed by splines, in the beam 6 and in the coupling half 2.

DESCRIPTION OF A FOURTH PREFERRED EMBODIMENT

Figure 5:
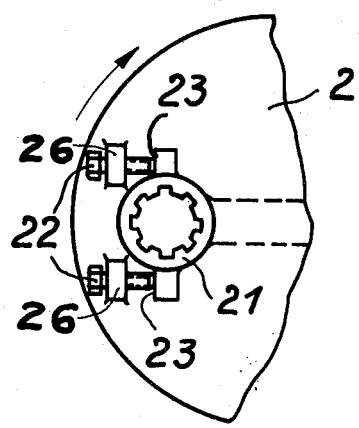
FIG. 5 is a section corresponding to that of FIG. 2a, but showing a fourth embodiment of the invention.

Since precise radial alignment of the coupling member 5 with respect to the abutment is important when the coupling is pre-stressed, it is possible, as in the fourth embodiment (FIG. 5), to provide the connection between the bolt 19 and the coupling half 2 by means of a receiver part 21 which is rotatably supported in the coupling half 2 and can be locked via abutment surfaces 23 by thrust screws 22 screwed through lugs 26 on the coupling half 2, or other suitable means. This avoids the necessity of having to maintain very close tolerances for the recess in the coupling half 2 which receives the end of the bolt 19 (or of the part 8) and for the coupling member 5.

Instead of applying the pre-stress with the screw 11, it is alternatively possible to apply such pre-stress by intermediate members (not shown in the drawing) disposed between the pawl 14 and the abutment surface 16.

We claim:

1. A coupling for transmitting torque between two rotary members, the coupling comprising:-
   a driving coupling part;
   a driven coupling part;
   abutment means on said coupling parts, respective said abutment means engaging and preventing relative rotation between said coupling parts in a direction opposite to that of relative rotation which said torque transmitted by said coupling tends to cause;

at least one coupling member which couples said coupling parts together at at least one position spaced from the axis of said coupling, said coupling member having a zone of reduced strength, which zone fractures when a predetermined overload on said coupling is exceeded, thereby interrupting effective transmission between said coupling parts;
   means for subjecting said zone of reduced strength to an additional force when a predetermined load, less than said predetermined overload, on said coupling is exceeded; and means for pre-stressing said coupling member and thereby applying a pre-stressing torque to both said coupling parts which is substantially equal to said predetermined load and is in a direction urging said abutment means together.

2. The coupling according to claim 1, wherein said coupling member comprises a beam which extends approximately radially of the axis of said coupling and whose end portions are connected to respective coupling parts, which beam has a rigid part and a flexible part, and wherein said prestressing means comprises an abutment fixed to one of said coupling parts, said abutment bearing against said beam.

3. The coupling according to claim 2, wherein said flexible part of said beam lies between said abutment and the position at which the respective said end portion of said beam is connected to said driving coupling part.

4. The coupling according to claim 2, wherein said abutment is fixed to said driving coupling part.

5. The coupling according to claim 2, wherein said abutment is eccentric of said axis of said coupling, on the side of said axis which is nearer said flexible part.

6. The coupling according to claim 2, wherein said beam is connected to respective said coupling parts at adjustable positions, said positions being adjustable to provide said pre-stress in the coupling member and thereby said pre-stressing torque.

7. The coupling according to claim 2, wherein said coupling member is generally L-shaped, said beam forming one limb of said L and the other limb of said L being connected to the end of said rigid part remote from said flexible part and extending approximately parallel to said axis of said coupling, the end portion of the latter said limb being connected to a respective said coupling part.

8. The coupling according to claim 7, wherein said latter limb comprises a bolt both of whose end portions are rotationally fixed respectively to said former limb and to a respective said coupling part.

9. The coupling according to claim 2, and comprising two said coupling members disposed parallel and opposite each other, respective said positions at which said coupling members are connected to said coupling parts being symmetrical.

10. The coupling according to claim 1, wherein said abutments are provided by a free-wheel device between said coupling parts, said free-wheel device comprising at least one pivoted pawl mounted on one said coupling part and thrust against an abutment surface on the other said coupling part when outwardly pivoted, which pawl permits free relative rotation between said coupling parts when said pawl is inwardly pivoted and said coupling member has fractured.

* * * * *